Apr. 10, 1923.
F. GOERTZ
CONTAINER
Filed Dec. 2, 1920
1,451,505
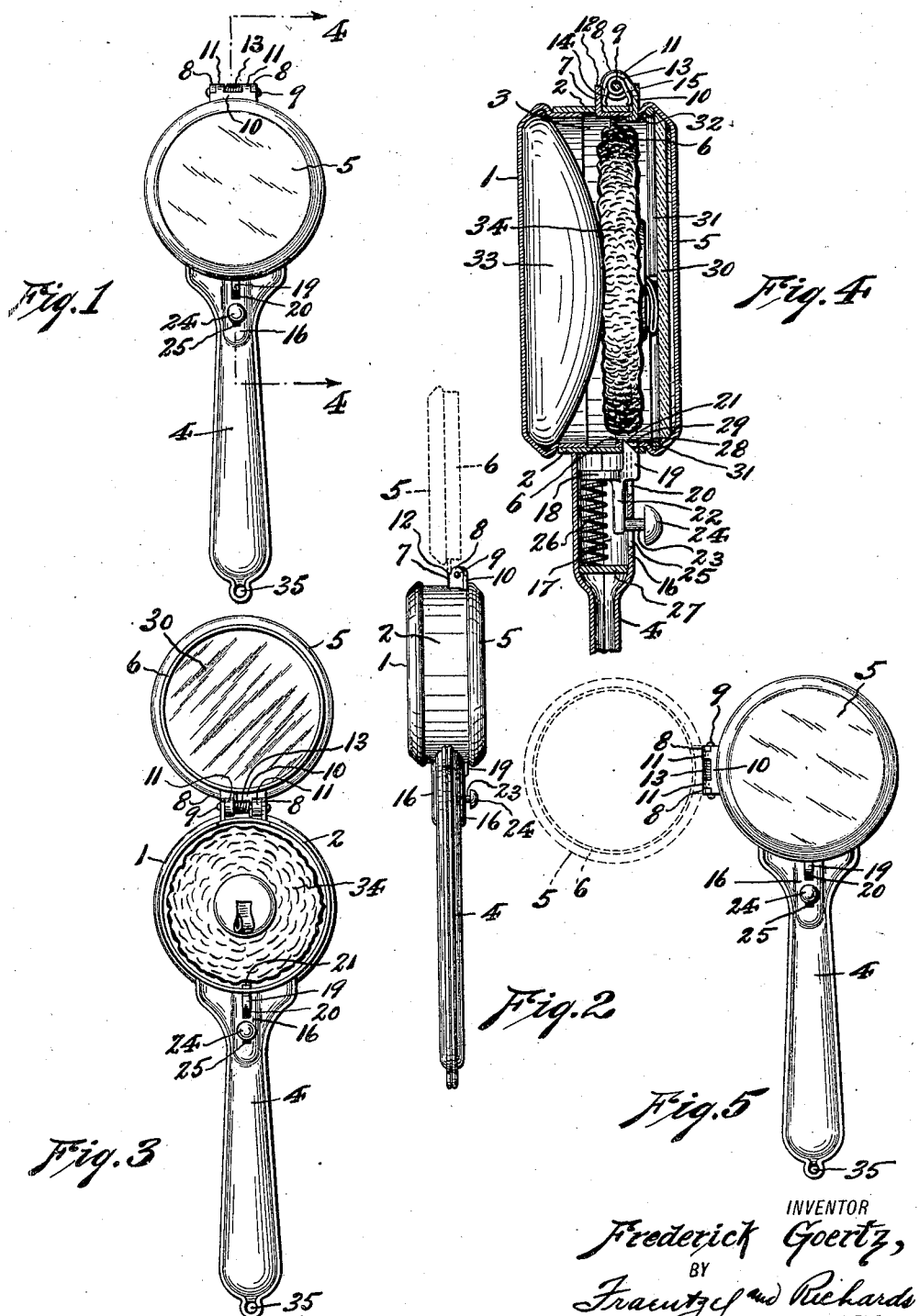
INVENTOR
Frederick Goertz,
BY
Fraentzel and Richards
ATTORNEYS Patented Apr. 10, 1923.

1,451,505

UNITED STATES PATENT OFFICE.

FREDERICK GOERTZ, OF NEWARK, NEW JERSEY, ASSIGNOR TO AUGUST GOERTZ & CO., A CORPORATION OF NEW JERSEY.

CONTAINER.

Application filed December 2, 1920. Serial No. 427,758.

*To all whom it may concern:*

Be it known that I, FREDERICK GOERTZ, a citizen of the United States, residing at Newark, in the county of Essex and State of New Jersey, have invented certain new and useful Improvements in Containers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in cases or containers adapted to hold face-powders or other cosmetics.

The invention has for its principal object to provide a novel construction of combined container and handle means having a spring actuated cover provided with a mirror and manipulatable means for releasing said cover for opening movement, so that the contents of the container and the mirror are presented for use.

Other objects of the invention, not at this time more particularly enumerated, will be clearly understood from the following detailed description of the same.

With the various objects of the invention in view, the same consists, primarily, in the novel construction of combined container and handle hereinafter set forth; and the invention consists, furthermore, in the novel arrangements and combinations of the various devices and parts, as well as in the details of the construction thereof, all of which will be more fully described in the following specification, and then finally embodied in the claims appended thereto.

The invention is clearly illustrated in the accompanying drawings, in which:—

Figure 1 is a face view of the novel combined container and handle means with the cover in closed position; Figure 2 is a side or edge view of the same, the open position of the cover being indicated in dotted outline; Figure 3 is a face view of the same with the cover in opened position; Figure 4 is a detail longitudinal vertical section through the same, taken on line 4—4 in said Figure 1, said view being drawn on an enlarged scale; and Figure 5 is a face view of the combined container and handle, showing a modified relation of the cover thereof to the main body, the open position of said cover being indicated in dotted outline.

Similar characters of reference are employed in all of the hereinabove described views, to indicate corresponding parts.

Referring now to Figures 1 to 4 inclusive of the drawings, I have illustrated therein one embodiment of my invention, the same comprising a main body or shell consising of a back wall 1 and laterally and forwardly extending side walls 2 arranged to provide a chamber or compartment 3, open at its forward end, adapted to receive and hold the contents to be enclosed in the container. Said main body or shell may be variously formed to produce any desired contour, shape or ornamental effect. Suitably connected with the side walls 2 of said main body or shell, so as to extend outwardly therefrom, is a handle member 4, which may be suitably shaped and ornamented as desired. The reference character 5 indicates a cover section which cooperates with the open side of said main body or shell. Said cover section is provided with an inwardly projecting off-set bezel portion 6 which fits telescopically within the open side of said main body or shell. Said cover section 5 is pivotally connected with said main body or shell by means of a hinge connection, which is preferably located with relation to said main body or shell at a point diametrically opposite the handle portion or member 4, so that when the cover section opens it will swing upwardly so as to stand vertically upright above the said main body or shell. Said hinge connection comprises the hinge-member 7, which is suitably fastened to the side walls 2 of said main body or shell and the ears 8 of which support a pintle 9, and the hinge member 10, which is suitably fastened to the bezel portion 6 of said cover-section, and which is provided with ears 11 rotatably engaged on said pintle 9. Said hinge-member 7 is provided at its rear side with a stop shoulder 12 which engages the hinge-member 10 when the cover-section is in open position to stop and hold said cover-section in vertical upright position. An actuating spring 13 is coiled about said pintle 9 between the ears 11 of said hinge-member 10, one arm 14 of which engages the hinge-member 7 and the other arm 15 of which engages the hinge-member 10. Said spring 13 is placed under tension by the closing movement of the cover-section 5, so that when the said cover-section is released the spring will tend to swing the cover-section upwardly to its open position. It will be understood that I do not necessarily limit myself to the specific details of the hinge structure as above specified and as shown in the drawings, since any desired form of spring actuated hinge connection which will readily move the cover-section to open position when released may be employed with equal advantage. In order to hold the cover-section 5 in normal closed position, I provide a holding catch or latch means mounted in connection with the upper end or base of the handle-member 4, and to this end said handle-member 4 is provided with a longitudinally disposed enlarged portion or cylindrical barrel 16 providing an internal socket 17. Arranged in said socket 17 for vertical movement is a catch-body 18 provided with a catch-piece 19 which projects laterally outward through a slot 20 provided in the front wall of said barrel 16. Said catch-piece 19 is provided at its upper free end with a chamfered catch-nosing 21. Said catch-body 18 is also provided with a depending tail-piece 22, with which is connected the outwardly projecting shank 23 of a releasing button 24, said shank 23 riding in a slot 25 formed in the front wall of said barrel 16. A compression spring 26 is disposed within said socket 17 between a bottom disc 27 and the underside of said catch-body 18, the tension of said spring holding said catch-body in normal upwardly projected position. The nosing 21 of said catch-piece 19 is normally thrust through an opening 28 provided in the side walls 2 of said main body or shell, so as to be operatively engaged in a catch-opening 29 provided in the bezel-portion 6 of the cover-section 5, thus holding said cover-section in closed relation to the main-body or shell against the opening tendency of the spring hinge connection which unites said parts.

Arranged within said cover-section 5 is a mirror member 30, the same being held in place by a retaining ring 31, which is sprung beneath the shoulder 32 formed at the juncture of said bezel-portion 6 with the main body of the cover-section. Said mirror may be otherwise secured in place if desired. The mirror faces outwardly when the cover-section stands in open position so as to be presented conveniently for use.

Suitably secured within the bottom of the main body or shell against the back wall 1 is a compact 33 of face-powder, or other desired form of cosmetic. Also disposed within the main body or shell over the compact 33 is a removable puff-member 34, which the user may remove and employ for transferring the powder from the compact 33 to the person.

The free end of the handle-member 4 may be provided with an eye-portion 35, whereby the device may suitably be carried or suspended by a chain or other suitable means convenient to the user.

In using the device, the same is held by the handle-member 4, and to open the cover-section the thumb is applied against the releasing button 24 to move the same downward, which operation draws downwardly the catch-body 18 against the tension of the spring 26 thereby retracting the catch-piece 19 so that the catch-nosing 21 is withdrawn out of the catch-opening 29 of the cover-section. The cover-section 5 being thus freed from the holding engagement of the catch mechanism, the spring actuated hinge connection operates to throw the cover-section upward to open upright position, thus not only opening the container so that the puff-member 33 may be removed for use, but also conveniently presenting the mirror 30 in operative reflecting position. It will be clear that the user may hold the device, and manipulate the catch-mechanism with one hand, so that both contents of the container and mirror may be quickly positioned for use, and so that one hand is free to remove and apply the puff-member. All the operations may be performed with ease when the user's hands are encased in gloves, and without danger of soiling the gloves.

As shown in Figure 5, it will be clear that the hinge-connection may be so located that the cover-section swings open laterally instead of vertically, if such arrangement be desired.

I am aware that some changes may be made in the general arrangements and combinations of the several devices and parts, as well as in the details of the construction thereof, without departing from the scope of the invention as set forth in the foregoing specification, and as defined in the appended claims. Hence, I do not limit my invention to the exact arragements and combinations of the said devices and parts as described in said specification, nor do I confine myself to the exact details of the construction of said parts, as illustrated in the accompanying drawings.

I claim:—

1. A container for the purposes described, comprising a main body open at one end, a cover for closing said main body, a spring hinge connected between said main body and cover adapted to actuate the opening movement of the latter, a mirror secured within said cover adapted to be disclosed when said cover is in open position, a handle member of substantial length projecting outwardly from the side of said main body and adapted to be grasped to support the container before the user, and a releasable catch means associated with said handle-member for holding said cover closed.

2. A container for the purposes described, comprising a main body open at one end, a cover for closing said main body, a spring hinge connected between said main body and cover adapted to actuate the opening movement of the latter, a handle member of substantial length projecting outwardly from the side of said main body and adapted to be grasped to support the container before the user, said handle having an internal socket, a spring pressed catch device movable in said socket, a finger piece projecting exteriorly from said handle for retracting said catch device, and said cover having means for receiving the operative engagement of said catch device.

In testimony, that I claim the invention set forth above I have hereunto set my hand this 30th day of November, 1920.

FREDERICK GOERTZ.

Witnesses:
GEORGE D. RICHARDS,
EVA E. DESCH.